July 22, 1958     H. M. BERGNER     2,844,343
FLATIRON SAFETY STAND
Filed Nov. 17, 1954
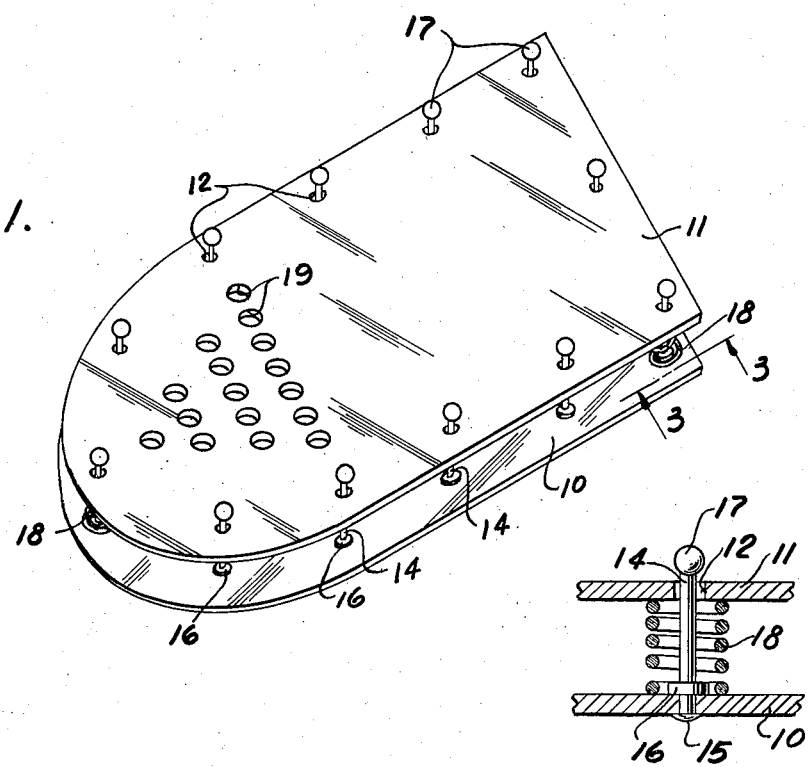
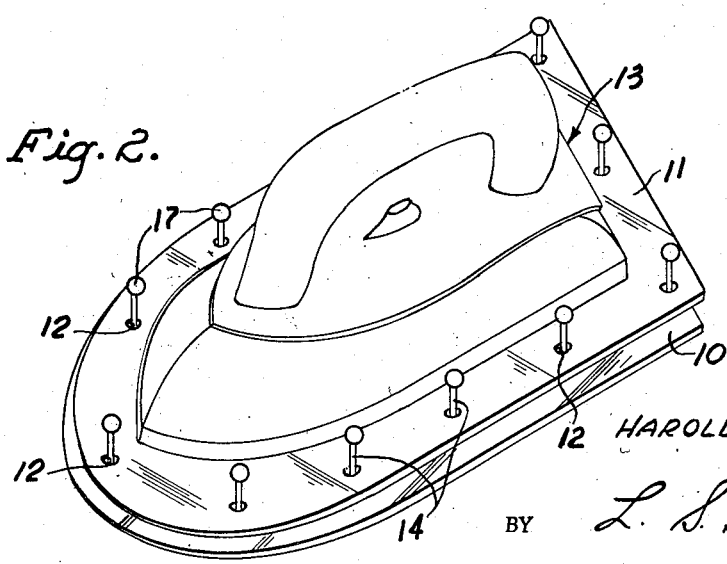
INVENTOR
HAROLD M. BERGNER
BY L. S. Saulsbury
ATTORNEY

2,844,343
FLATIRON SAFETY STAND

Harold M. Bergner, Bronx, N. Y.

Application November 17, 1954, Serial No. 469,474

1 Claim. (Cl. 248—117.2)

This invention relates to a flatiron stand having a safety device.

It is an object of this invention to provide a safety stand for a flatiron.

It is another object of this invention to provide a safety stand for a flatiron which will present a smooth top surface when an iron is not in position on the stand.

It is a further object of this invention to provide a normally smooth top flatiron safety stand which will present a plurality of flatiron retaining pegs when a flatiron is placed upon the stand.

It is a still further object of this invention to provide a flatiron safety stand which will permit the escape of steam or drip from a steam flatiron resting on the stand.

Other objects of the invention are to provide a safety stand for a flatiron having the above objects in mind which is of simple construction, inexpensive to manufacture, compact, attractive, easy to use and certain in operation.

For other objects and a better understanding of the invention, reference may be had to the following detailed description taken in connection with the accompanying drawing, in which:

Figure 1 is a perspective view of the safety flatiron stand;

Fig. 2 is a perspective view of the safety flatiron stand with an iron in position on the stand; and Fig. 3 is a fragmentary sectional view taken along the line 3—3 of Fig. 1.

Referring now to the figures, 10 is a lower flat plate and 11 is an upper flat plate, each having in general the shape of the outline of a flatiron and each somewhat larger than a flatiron. Upper plate 11 is provided with a plurality of small openings 12 disposed inwardly of the outline of the plate, and themselves outlining an area somewhat larger than the surface area of a flatiron, such as the iron 13 shown on the stand in Fig. 2.

A plurality of elongated pegs 14 having heads 15 extend upwardly through respective openings in lower plate 10 and through the openings 12 in upper plate 11. Lower plate 10 is held firmly between peg heads 15 and a spring retaining collar 16 snapped into grooves 16' in the respective pegs 14. The upper ends of pegs 14 have enlarged rounded portions 17 which are larger than the openings 12 in upper plate 11 so as to limit the upward movement of the plate.

A plurality of compression springs 18, here shown as helical springs, are disposed about certain of the pegs 14 between lower plate 10 and upper plate 11 to urge plate 11 upwardly along the pegs. These springs should be of such size and strength that when no flatiron is on the stand, upper plate 11 will be caused to move upwardly against the enlarged rounded portions 17. While any desired number of helical springs 18 may be used, it will be found convenient to provide one such spring at each corner of that portion of the stand which is to receive the heel of the iron and one at that portion of the stand which is to receive the toe of the iron.

The portion of upper plate 11 which is to receive the toe portion of the flatiron is provided with a plurality of openings 19 to permit the escape of steam or drip when a steam iron is placed upon the stand. If desired, the outer edges of lower plate 10 may be turned up so as to retain any drip passing through the openings 19.

The stand may be made of any of the various suitable metals, or of any other suitable heat resistant material.

The stand may be movable; it may be fastened to the top of an ironing board; or it may be attached to an ironing board in offset relation thereto.

It will be obvious from the foregoing description that when there is not a flatiron on the stand, the spring means 18 will urge top plate 11 upwardly until enlarged rounded portions 17 of pegs 14 prevent further movement. Then, the top surface of plate 11 and the rounded members 17 will present a relatively smooth surface, as shown in Fig. 1. When a flatiron is placed on the plate 11 within the area outlined by enlarged portions 17, as shown in Fig. 2, the plate will be forced downwardly against spring members 18 by the weight of the flatiron. The pegs 14 will then extend upwardly through the openings 12 in plate 11 so as to provide means for retaining the flatiron in position on the rest. The springs 18 will, of course, be of such size and strength that plate 11 will be spaced apart from plate 10 even when there is a flatiron on the stand.

While various changes may be made in the detail construction, it shall be understood that such changes shall be within the spirit and scope of the present invention as defined by the appended claim.

What is claimed is:

A safety flatiron stand comprising upper and lower plates having in general the shape of the outline of a flatiron having a heel and a toe, said upper plate having a plurality of drip openings, the upper plate being provided with a plurality of small openings disposed inwardly the outline thereof and uniformly spaced therefrom, a plurality of peg members passing through said lower plate inwardly the outline thereof and extending upwardly through the openings in said upper plate, rounded stop members on the upper ends of said peg members, a collar on each peg member to secure the latter in the lower plate, and helical spring members disposed about at least two peg members adjacent the portion of the stand adapted to receive the heel of an iron and about at least one peg adjacent the portion of the stand adapted to receive the toe of the iron, said helical springs urging the unloaded upper member upwardly against said rounded stop members, when said upper plate is unloaded and compressible when a flat iron is on said upper plate.

References Cited in the file of this patent

UNITED STATES PATENTS

| | | |
|---|---|---|
| 1,101,967 | Smith | June 30, 1914 |
| 1,251,053 | Kuhn et al. | Dec. 25, 1917 |
| 1,509,750 | Campbell | Sept. 23, 1924 |
| 2,246,323 | Schaelchlin | June 17, 1941 |
| 2,581,416 | Irby et al. | Jan. 8, 1952 |
| 2,611,400 | Shore | Sept. 23, 1952 |
| 2,655,333 | Taylor | Oct. 13, 1953 |